J. W. GORDON.
Corn Sheller.
No. 4,806.
Patented Oct. 7, 1846.
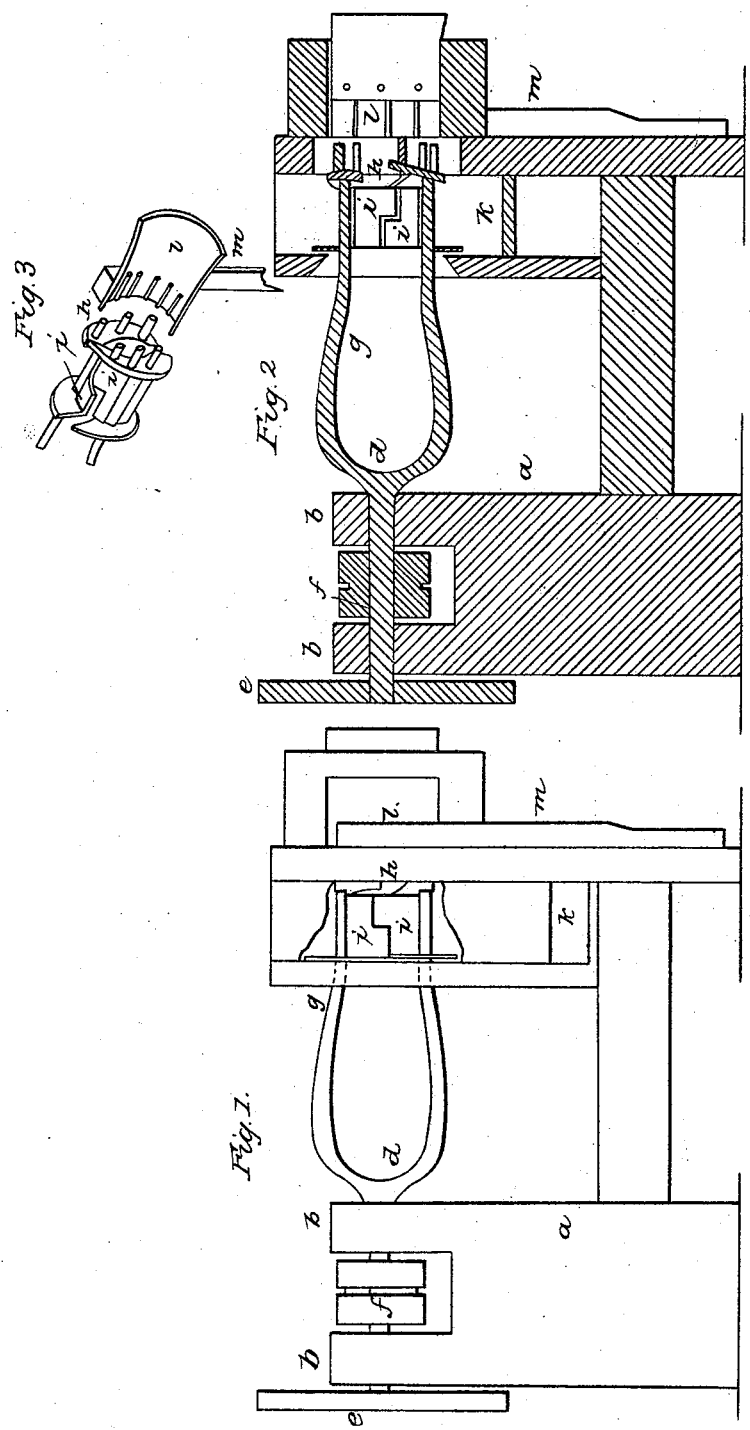

UNITED STATES PATENT OFFICE.

J. W. GORDON, OF JAMESTOWN, NORTH CAROLINA.

CORN-SHELLER.

Specification of Letters Patent No. 4,806, dated October 7, 1846.

*To all whom it may concern:*

Be it known that I, JONATHAN W. GORDON, of Jamestown, in the county of Guilford and State of North Carolina, have invented new and useful Improvements in Machines for Shelling Corn, and that the following is a full, clear, and exact description of the principle or character which distinguishes them from all other things before known and of the manner of making, constructing, and using the same, reference being had to the accompanying drawings, making part of this specification, in which—

Figure 1 is a geometrical elevation, and Fig. 2, a section vertically through the machine. Fig. 3, detached parts.

The same letters indicate like parts in all the figures.

The nature of my invention consists in a revolving screw formed sheller having a stationary holder through which the ear of corn is drawn by the screw, said holder preventing the ear from turning while being shelled by the flyer.

The construction of my machine is as follows: On a suitable frame (*a, a*) are puppet heads or bearings (*b, b*) for a mandrel (*d*) to turn in; on the outer end of said mandrel there is a fly wheel (*e*) and between the bearings there is a pulley (*f*). The inner end of the mandrel is forked as shown at (*g*) in the drawing, the two parts being made to bow outwards and then gradually approach each other; on the end of each of these forks there is a segment of one thread (*h*) of a screw from the inclined face of which teeth project parallel with the axis; directly behind these segments are attached to the same arms two segments (*i*) of a cylindrical tube; as the arms (*g*) are somewhat elastic, when the machine is not in operation the spring with the above described parts closes within the limits of the circle as shown in Fig. 3, but when the ear of corn is forced in it spreads them to a distance apart sufficient to admit the cob and the corn is shelled therefrom by the teeth on the screw thread, while said thread draws forward the cob and causes it to pass out between the arms (*g*). The above described parts attached to the end of the arms (*g*) are made to revolve in a case which receives the corn and discharges it through a spout (*k*) while the cob is thrown beyond it. In front of this case and opposite the end of the arms and thread (*h*) are two jaws (*l*) of a semi cylindrical form (one of which is shown in Fig. 3, in its relative position to (*h*)) one on each side which are borne toward each other by springs (*m*), the inner sides of these jaws are concave and are armed with projections to prevent the ear of corn which they grasp from turning.

Having thus fully described my improvement, I wish it to be understood that I do not claim a revolving tube armed with teeth on the inside for shelling corn, as that has before been done; but

What I do claim as my invention and desire to secure by Letters Patent is—

The revolving spring arms having segments of screws on their ends for drawing in the cobs through, and teeth for shelling the corn from the cob in the manner described, and, in combination therewith, the jaws for holding the ear of corn to prevent its turning while being shelled, as described.

J. W. GORDON.

Witnesses:
S. W. SELBY,
CHAS. N. GRANNIS.